United States Patent
Murakami

(10) Patent No.: US 10,057,259 B2
(45) Date of Patent: Aug. 21, 2018

(54) IN-VEHICLE AUTHENTICATION SYSTEM

(71) Applicant: TOYOTA JIDOSHA KABUSHIKI KAISHA, Toyota-shi, Aichi-ken (JP)

(72) Inventor: Kunihiro Murakami, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/816,092

(22) Filed: Nov. 17, 2017

(65) Prior Publication Data
US 2018/0145977 A1 May 24, 2018

(30) Foreign Application Priority Data
Nov. 24, 2016 (JP) ................. 2016-227685

(51) Int. Cl.
*H04L 29/06* (2006.01)
*G07C 9/00* (2006.01)
*H04L 29/08* (2006.01)
*H04W 4/40* (2018.01)
*H04W 12/06* (2009.01)

(52) U.S. Cl.
CPC ...... *H04L 63/0869* (2013.01); *G07C 9/00309* (2013.01); *H04L 67/125* (2013.01); *H04W 4/40* (2018.02); *H04W 12/06* (2013.01); *G07C 2009/00547* (2013.01)

(58) Field of Classification Search
CPC ... H04L 63/0869; H04W 4/40; G07C 9/00309
USPC .................................. 340/5.8–5.85
See application file for complete search history.

(56) References Cited

U.S. PATENT DOCUMENTS

| 7,334,260 B1* | 2/2008 | Inadate | G06Q 30/06 705/26.1 |
| 2003/0161300 A1* | 8/2003 | Malik | H04L 12/5692 370/352 |
| 2009/0025075 A1* | 1/2009 | Chow | H04L 63/0823 726/10 |
| 2012/0328101 A1* | 12/2012 | Lakshminarayanan | H04L 63/0823 380/258 |

(Continued)

FOREIGN PATENT DOCUMENTS

JP 2015-005970 A 1/2015
JP 2015-080111 A 4/2015

Primary Examiner — Allen T Cao
(74) Attorney, Agent, or Firm — Hunton Andrews Kurth LLP

(57) ABSTRACT

An in-vehicle authentication system is disclosed. The in-vehicle authentication system includes a first authentication object apparatus; and a second authentication object apparatus configured to perform communication with the first authentication object apparatus. The first authentication object apparatus and the second authentication object apparatus are configured to perform mutual authentication via the communication such that a relationship between an authenticating side and an authenticated side is exchanged, and at least one of the first authentication object apparatus and the second authentication object apparatus transmits, to a counterpart, an authentication response in response to an authentication response demand from the counterpart and an authentication response demand from itself to the counterpart by a single transmission signal.

7 Claims, 7 Drawing Sheets

(56) References Cited

U.S. PATENT DOCUMENTS

2014/0366095 A1* 12/2014 Blanco ............... H04L 63/0492
              726/3
2016/0236653 A1    8/2016 Katou et al.

* cited by examiner

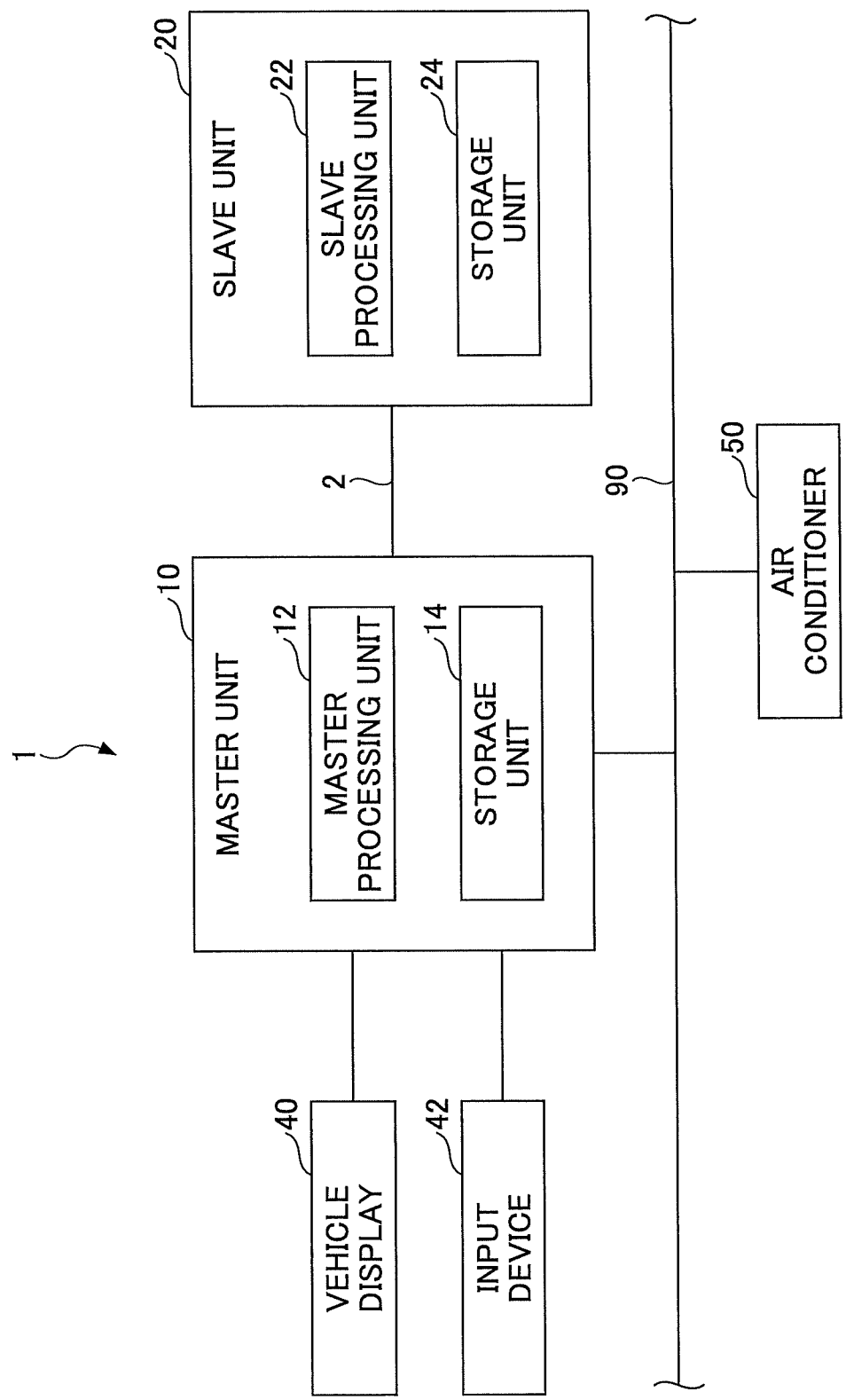

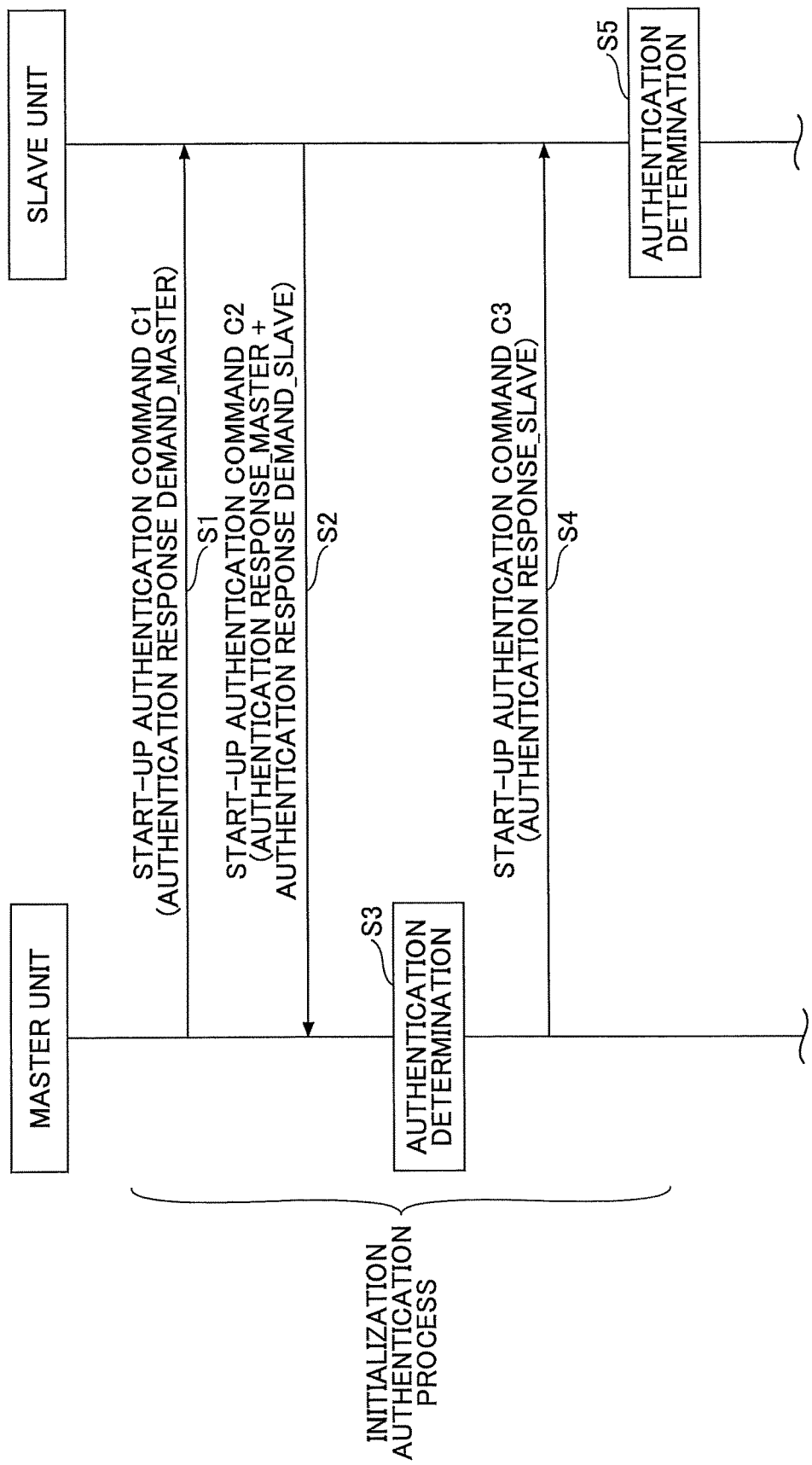

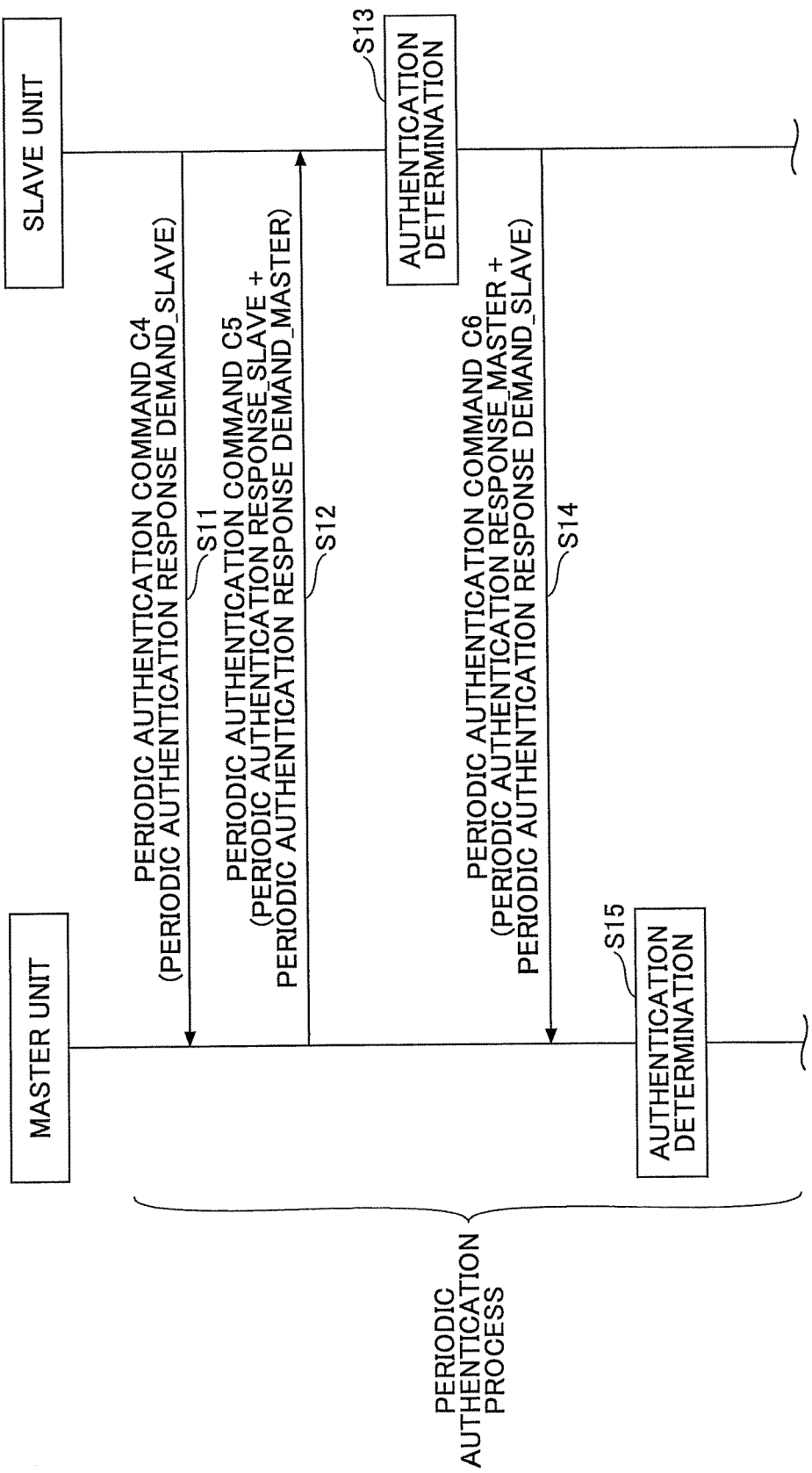

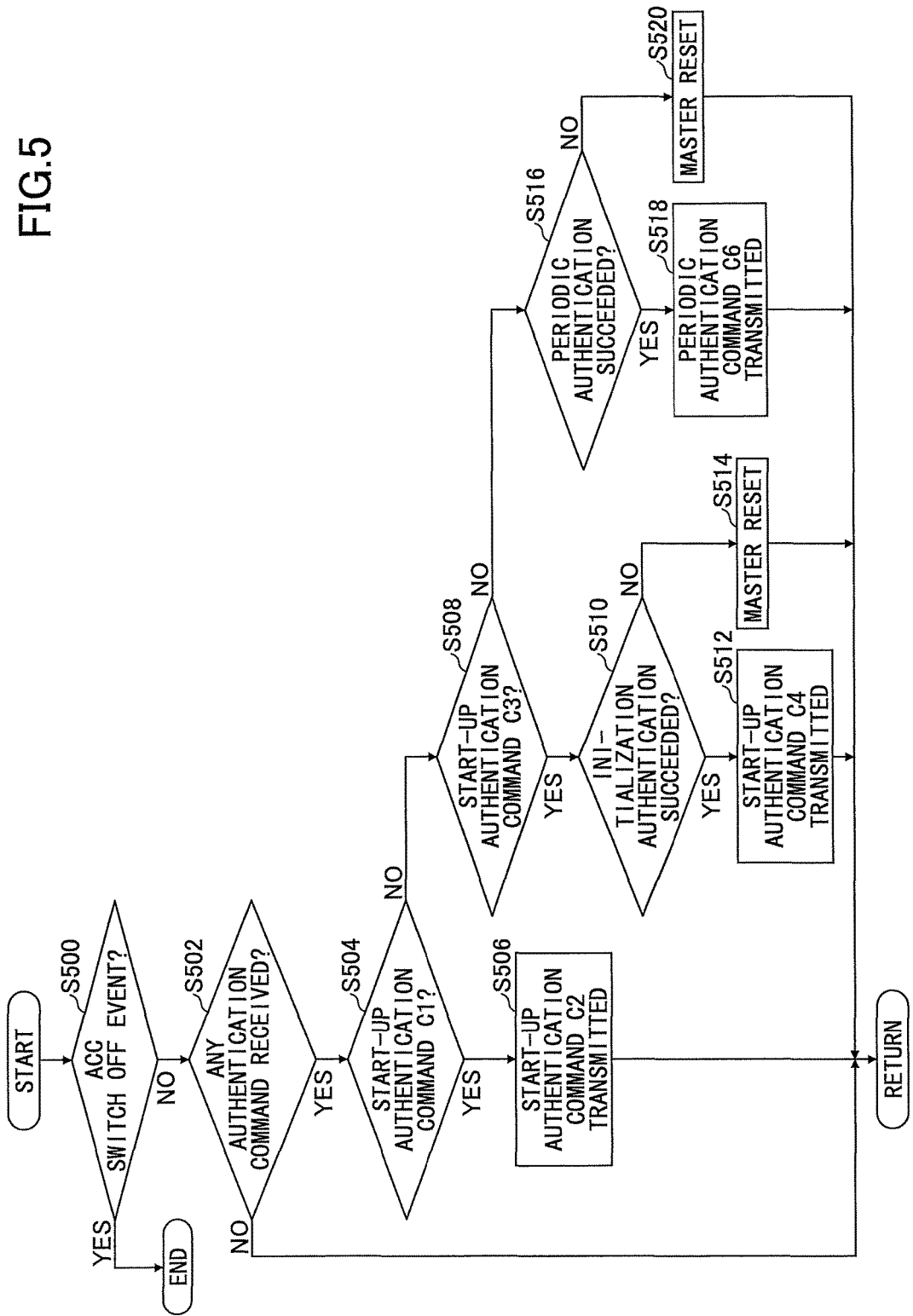

IN-VEHICLE AUTHENTICATION SYSTEM

CROSS REFERENCE TO RELATED APPLICATION

The present application is based on and claims the benefit of priority of Japanese Priority Application No. 2016-227685, filed on Nov. 24, 2016, the entire contents of which are hereby incorporated by reference.

FIELD

The disclosure is related to an in-vehicle authentication system.

BACKGROUND

A technique for mutual authentication between two authentication object apparatuses are known from, Japanese Laid-open Patent Publication No. 2015-080111, for example.

However, according to the prior art, since communication for a single mutual authentication is required at least 4 times, there is a problem that it is not efficient. Between the two authentication object apparatuses, there is a probability that a communication path other than for the mutual authentication is used, and thus it is desirable to reduce as much as possible the number of times of communication required per single mutual authentication.

SUMMARY

According to one aspect, an in-vehicle authentication system is disclosed, the in-vehicle authentication system comprising:
a first authentication object apparatus; and
a second authentication object apparatus configured to perform communication with the first authentication object apparatus, wherein
the first authentication object apparatus and the second authentication object apparatus are configured to perform mutual authentication via the communication such that a relationship between an authenticating side and an authenticated side is exchanged, and
at least one of the first authentication object apparatus and the second authentication object apparatus transmits, to a counterpart, an authentication response in response to an authentication response demand from the counterpart and an authentication response demand from itself to the counterpart by a single transmission signal.

BRIEF DESCRIPTION OF DRAWINGS

FIG. 1 is a diagram illustrating an in-vehicle authentication system according to an embodiment.
FIG. 2A is a timing chart explaining an initialization authentication process.
FIG. 2B is a timing chart explaining a periodic authentication process.
FIG. 5 is a flowchart schematically illustrating an example of a mutual authentication process executed by a slave processing unit.

DESCRIPTION OF EMBODIMENTS

Figure 3A:
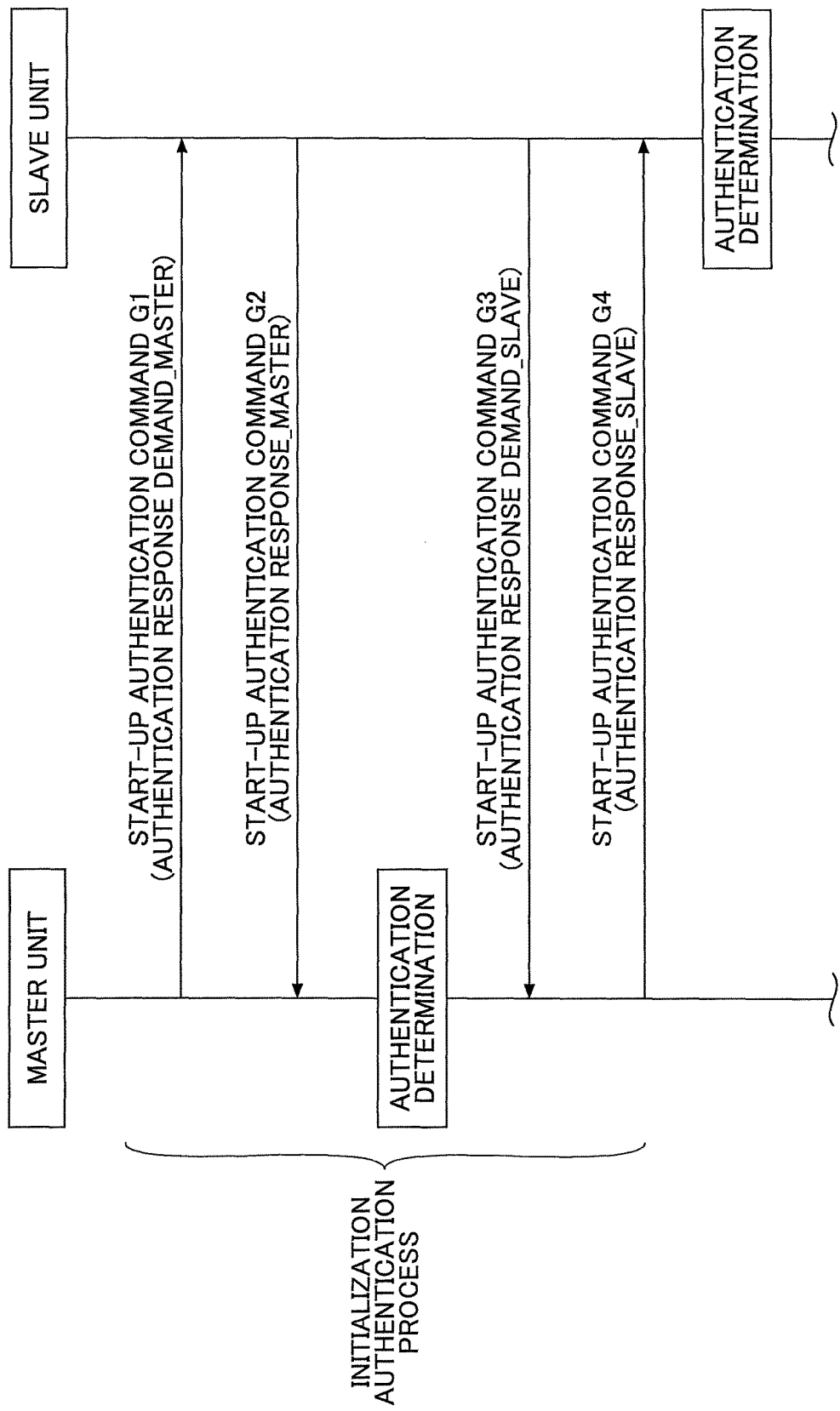
FIG. 3A is a timing chart explaining an initialization authentication process according to a comparative example.

In the following, embodiments will be described with reference to the accompanying drawings.

FIG. 1 is a diagram illustrating an in-vehicle authentication system 1 according to an embodiment.

The in-vehicle authentication system 1 is installed on a vehicle. The in-vehicle authentication system 1 includes a communication line 2, a master unit 10 (an example of a first authentication object apparatus) and a slave unit 20 (an example of a second authentication object apparatus).

The master unit 10 and the slave unit 20 form a multimedia system in coordination in such as relation that the master unit 10 is "master" and a slave unit 20 is "slave". The multimedia system may be a multimedia-based system, such as a navigation system, an audio device, a TV tuner, etc. The master unit 10 implements functions whose specifications don't have a high probability of being changed and related a basic function such an audio device, a TV tuner, etc. On the other hand, the slave unit 20 implements functions whose specifications have a relatively high probability of being changed and related to an additional function such as a navigation system, a voice recognition device, etc.

The master unit 10 and the slave unit 20 perform communication via the communication line 2 to exchange various kinds of information. The communication line 2 is a USB (Universal Serial Bus), for example. The information to be exchanged via the communication line between the master unit 10 and the slave unit 20 includes, in addition to information for mutual authentication described later, information for arbitration of video signals, information for realizing a voice recognition function in coordination, etc.

The master unit 10 is directly coupled to a vehicle network 90 such as CAN (controller area network). On the other hand, the slave unit 20 is not directly coupled to the vehicle network 90.

The master unit 10 is coupled to various electronic components in the vehicle (an air conditioner 50, etc.) via the vehicle network 90. The master unit 10 realizes, based on a user input received via an input device 42, functions related to settings of the air conditioner 50 (one example of a predetermined function) via the vehicle network 90. For example, the master unit 10 generates, based on user input, a setting signal concerning set temperature and air volume, etc., and transmits the setting signal to the vehicle network 90. The air conditioner 50 controls a compressor and blower motor or the like (not illustrated) based on the setting signal. The input device 42 is, for example, a touch pad, or a touch panel which may be provided in a vehicle display 40. In this case, it is possible to obtain the user input via a GUI (Graphical User Interface) image displayed on the touch panel.

The master unit 10 realizes, based on a user input received via the input device 42, functions (hereinafter, referred to as "vehicle-setting functions")(one example of a predetermined function) related to settings of a cruise control mode, and settings of a driving support device (clearance sonar, etc.), etc., in addition to the settings of the air conditioner 50, via the vehicle network 90.

The master unit 10 and the slave unit 20 are configured to confirm a validity of their counterpart based on information exchanged via the communication line 2. That is, the master unit 10 checks the validity of the slave unit 20, and the slave unit 20 checks the validity of the master unit 10. The mutual authentication is successful if the validity of a counterpart is checked (confirmed) on each side. The authentication is performed by such a logic that the authentication succeeds when the authenticated side is a nominal (legitimate) component while the authentication fails when the authenticated side is a part of so-called "spoofing". In this embodiment, an authentication method is employed such that the authentication is successful when an authentication response demand (request) generated on an authenticating side and an authentication response generated in response to the authentication response demand on an authenticated side has a predetermined relationship. The predetermined relationship can be met only by the valid authentication response, and is specified in advance. In this embodiment, as an example, the predetermined relationship is such that a hash value related to the authentication response demand matches a hash value related to the authentication response. The hash values are generated by converting appropriate data with a hash function so that the reconstruction of the original data is not possible, which is effective against eavesdropping. In this case, a common hash function is given in advance to the authenticating side and the authenticated side. Specific examples of a method of checking the validity are described later.

In a state where the mutual authentication described later is successful, all communication between the master unit 10 and the slave unit 20 is possible, and the master unit 10 operates in coordination with the slave unit 20. For example, the master unit 10, in coordination with the slave unit 20, generates an image on the vehicle display 40. Accordingly, the master unit 10, based on a video signal for a navigation image from the slave unit 20, can output the navigation image to the vehicle-mounted display 40. Note that, instead of the vehicle display 40, a display of a mobile terminal (e.g., a smart phone) that a user can bring in the vehicle may be utilized.

The master unit 10 and the slave unit 20 perform an initialization authentication process when the master unit 10 is initialized. The initialization of the master unit 10 occurs at the time of a startup of the vehicle or a reset of the master unit 10. The initialization authentication process is described hereinafter with reference to FIG. 2A.

The master unit 10 and the slave unit 20, if the mutual authentication in the initialization authentication process is successful, then further periodically perform a periodic authentication process. Note that the term "periodically" includes not only repeating at a constant cycle but also repeating at a non-constant cycle. However, in the embodiment, as an example, a periodic authentication processing is realized by repeating at a constant cycle. For example, the master unit 10 and the slave unit 20 perform the periodic authentication process every 30 seconds until an accessory switch of the vehicle is turned off. The periodic authentication process is described hereinafter with reference to FIG. 2B.

The master unit 10 and the slave unit 20 each include processors 12, 22, and storage units 14, 24 for storing a common hash function.

The processors 12 and 22, respectively, are configured by a computer. The storage units 14 and 24 are configured by a non-volatile memory. The hash function is stored in advance in the storage units 14 and 24. The storage units 14 and 24, for example, are realized in a highly tamper-resistant hardware, for example, an IC chip to which a tamper-resistant technology (concealment of an internal circuit) is applied. Hereinafter, the processors 12 and 22 are referred to as the master processing unit 12 and the slave processing unit 22, respectively.

FIG. 2A is a timing chart for explaining the initialization authentication process. Note that the transmission and reception of transmission signals between the master unit 10 and the slave unit 20 described below (various authentication commands, such as a start-up authentication command), are realized through the communication line 2.

When the initialization authentication process is started, first, the master processing unit 12 transmits a start-up authentication command C1 (an example of a first signal) to the slave unit 20 (S1). In the start-up authentication command C1, an authentication response demand from the master unit 10 (hereinafter, referred to as "authentication response demand_master") is included. The authentication response demand_master, which is information necessary for an authentication determination (S3) on the master unit 10 side, is generated by the master processing unit 12. For example, the authentication response demand_master is generated based on random numbers R1(random data) that are generated in the master unit 10. Here, as an example, the authentication response demand_master is random number data R1 itself.

The slave processing unit 22, if having received the start-up authentication command C1, transmits a start-up authentication command C2 (an example of a second signal) to the master unit 10 (S2).

In the start-up authentication command C2, an authentication response (hereinafter referred to as "authentication response_master") to the start-up authentication command C1 is included. The authentication response_master, which is information necessary for an authentication determination (S3) on the master unit 10 side, is generated by the slave processing unit 22. Here, as an example, the slave processing unit 22 generates the authentication response_master based on the random number data R1 included in the start-up authentication command C1 and the hash function stored in the storage unit 24. In this case, the authentication response_master is a hash value of the random number data R1 by the hash function.

In the start-up authentication command C2, an authentication response demand from the slave unit 20 (hereinafter, referred to as "authentication response demand_slave") is further included. The authentication response demand_slave, which is information necessary for an authentication determination (S5) on the slave unit 20 side, is generated by the slave processing unit 22. For example, the authentication response demand_slave is generated based on random numbers R2 generated in the slave unit 20. Here, as an example, the authentication response demand_slave is random number data R2 itself.

In this way, in the embodiment, in the start-up authentication command C2, not only the authentication response_master but also the authentication response demand_slave are included. That is, the start-up authentication command C2 includes the authentication response and the authentication response demand simultaneously. Correspondingly, as compared to a comparative example in which the authentication response_master and the authentication response demand_slave are transmitted from the slave unit 20 to the master unit 10 by separate commands (see FIG. 3A below), the number of times of communication between the master unit 10 and the slave unit 20 for the initialization authentication process can be reduced.

The master processing unit 12, if having received the start-up authentication command C2, performs the authentication determination (S3). Specifically, the master processing unit 12 confirms a validity of the slave unit 20 based on the presence or absence of a predetermined correspondence relationship between the authentication response demand_master included in the start-up authentication command C1 and the authentication response_master included in the start-up authentication command C2. Specifically, the master processing unit 12 calculates the hash value of the random number data R1 related to the authentication response demand_master based on the hash function in the storage unit 14, and determines whether the calculated hash value matches the hash value related to the authentication response_master included in the start-up authentication command C2. If there is a match between these hash values, the validity of the slave unit 20 has been confirmed (i.e., the authentication is successful). On the other hand, if there is no match between these hash values, and the validity of the slave unit 20 is not confirmed (i.e., the authentication is failed).

When the authentication has been successful, the master processing unit 12 transmits a start-up authentication command C3 (an example of a third signal) to the slave unit 20 (S4).

In the start-up authentication command C3, an authentication response (hereinafter referred to as "authentication response_slave") to the start-up authentication command C2 is included. The authentication response_slave, which is information necessary for the authentication determination (S5) on the slave unit 20 side, is generated by the master processing unit 12. Here, as an example, the master processing unit 12 generates the authentication response_slave based on the random number data R2 included in the start-up authentication command C2 and the hash function stored in the storage unit 14. In this case, the authentication response_slave is a hash value of the random number data R2 by the hash function.

The slave processing unit 22, if having received the start-up authentication command C3, performs the authentication determination (S5). Specifically, the slave processing unit 22 confirms a validity of the master unit 10 based on the presence or absence of a predetermined correspondence relationship between the authentication response demand_slave included in the start-up authentication command C2 and the authentication response_slave included in the start-up authentication command C3. More specifically, the slave processing unit 22 calculates the hash value of the random number data R2 related to the authentication response demand_slave based on the hash function in the storage unit 24, and determines whether the calculated hash value matches the hash value related to the authentication response_slave included in the start-up authentication command C3. If there is a match between these hash values, the authentication is successful, but if there is no match between these hash values, the authentication is unsuccessful. If the authentication has succeeded, the mutual authentication related to the initialization authentication process (one mutual authentication) has succeeded. Note that, according to the embodiment, as illustrated in FIG. 2A, the number of times of communication required for the mutual authentication related to the initialization authentication process is three for the start-up authentication commands C1, C2, and C3.

FIG. 2B is a timing chart illustrating a periodic authentication process following the initialization authentication process illustrated in FIG. 2A.

When the periodic authentication process is started, first, the slave processing unit 22 transmits a periodic authentication command C4 (an example of a fourth signal) to the master unit 10 (S11). The transmission timing is preferably immediately after the authentication determination illustrated in FIG. 2A (S5). This is because the periodic authentication command C4 has a function (hereinafter, referred to as "notification function") of notifying the master processing unit 12 that the authentication in the initial authentication process on the slave unit 20 side has been successful. Therefore, when the periodic authentication command C4 is transmitted immediately after the authentication determination (S5), the master unit 10 can detect rapidly that the mutual authentication has been successful in the initialization authentication process, and can promptly start operations in coordination with the slave unit 20.

In the periodic authentication command C4, an authentication response demand from the slave unit 20 (hereinafter, referred to as "periodic authentication response demand_slave") is included. The periodic authentication response demand_slave, which is information necessary for an authentication determination (S13) on the slave unit 20 side, is generated by the slave processing unit 22. For example, the periodic authentication response demand_slave is generated based on random numbers R2 generated in the slave unit 20. Here, as an example, the periodic authentication response demand_slave is random number data R2 itself.

The master processing unit 12, if having received the periodic authentication command C4, transmits a periodic authentication command C5 (an example of a fifth signal) to the slave unit 20 (S12).

In the periodic authentication command C5, a periodic authentication response (hereinafter referred to as "periodic authentication response_slave") to the periodic authentication command C4 is included. The periodic authentication response_slave, which is information necessary for the authentication determination (S13) on the slave unit 20 side, is generated by the master processing unit 12. Here, as an example, the master processing unit 12 generates the periodic authentication response_slave based on random number data R3 included in the periodic authentication command C4 and the hash function stored in the storage unit 14. In this case, the periodic authentication response_slave is a hash value of the random number data R3 by the hash function.

In the periodic authentication command C5, a periodic authentication response demand from the master unit 10 (hereinafter, referred to as "periodic authentication response demand_master") is further included. The periodic authentication response demand_master, which is information necessary for an authentication determination (S15) on the master unit 10 side, is generated by the master processing unit 12. For example, the periodic authentication response demand_master is generated based on random numbers R4 generated in the master unit 10. Here, as an example, the periodic authentication response demand_master is random number data R4 itself.

In this way, in the embodiment, in the periodic authentication command C5, not only the periodic authentication response_slave but also the periodic authentication response demand_master are included. That is, the periodic authentication command C5 includes the periodic authentication response and the periodic authentication response demand simultaneously. Correspondingly, as compared to a comparative example in which the periodic authentication response_slave and the periodic authentication response demand_master are transmitted from the master unit 10 to the slave unit 20 by separate commands (see FIG. 3B below), the number of times of communication between the master unit 10 and the slave unit 20 for the periodic authentication process can be reduced.

The slave processing unit 22, if having received the periodic authentication command C5, performs the authentication determination (S13). Specifically, the slave processing unit 22 confirms the validity of the master unit 10 based on the presence or absence of the predetermined correspondence relationship between the periodic authentication response demand_slave included in the periodic authentication command C4 and the periodic authentication response_slave included in the periodic authentication command C5. More specifically, the slave processing unit 22 calculates the hash value of the random number data R3 related to the periodic authentication response demand_slave based on the hash function in the storage unit 24, and determines whether the calculated hash value matches the hash value related to the periodic authentication response_slave included in the periodic authentication command C5. If there is a match between these hash values, the authentication is successful, but if there is no match between these hash values, the authentication is unsuccessful.

When the authentication has been successful, the slave processing unit 22 transmits a periodic authentication command C6 (an example of a sixth signal) to the master unit 10 (S14).

In the periodic authentication command C6, a periodic authentication response (hereinafter referred to as "periodic authentication response_master") to the periodic authentication command C5 is included. The periodic authentication response_master, which is information necessary for an authentication determination (S15) of the master unit 10 side, is generated by the slave processing unit 22. Here, as an example, the slave processing unit 22 generates the periodic authentication response_master based on the random number data R4 included in the periodic authentication command C5 and the hash function stored in the storage unit 24. In this case, the periodic authentication response_master is a hash value of the random number data R4 by the hash function.

In the periodic authentication command C6, a periodic authentication response demand_slave is further included. The periodic authentication response demand_slave, which is information necessary for the next authentication determination (not illustrated, the next authentication determination corresponding to S13) on the slave unit 20 side, is generated by the slave processing unit 22. The periodic authentication response demand_slave is generated by substantially the same way as the periodic authentication response demand_slave included in the periodic authentication command C4. Note that the periodic authentication response demand_slave included in the periodic authentication command C6 is generated based on the newly generated random number data R3.

In this way, in the embodiment, in the periodic authentication command C6, not only the periodic authentication response_master but also the periodic authentication response demand_slave are included. That is, the periodic authentication command C6 includes the periodic authentication response and the periodic authentication response demand simultaneously. Correspondingly, as compared to a comparative example in which the periodic authentication response_master and the periodic authentication response demand_slave are transmitted from the slave unit 20 to the master unit 10 by separate commands (see FIG. 3B below), the number of times of communication between the master unit 10 and the slave unit 20 for the periodic authentication process can be reduced.

The master processing unit 12, if having received the periodic authentication command C6, performs the authentication determination (S15). Specifically, the master processing unit 12 confirms the validity of the slave unit 20 based on the presence or absence of the predetermined correspondence relationship between the periodic authentication response demand_master included in the periodic authentication command C5 and the periodic authentication response_master included in the periodic authentication command C6. More specifically, the master processing unit 12 calculates the hash value of the random number data R4 related to the periodic authentication response demand_master based on the hash function in the storage unit 14, and determines whether the calculated hash value matches the hash value related to the periodic authentication response_master included in the periodic authentication command C6. If there is a match between these hash values, the authentication is successful, but if there is no match between these hash values, the authentication is unsuccessful. If the authentication has succeeded, the first mutual authentication related to the periodic authentication process (one mutual authentication) has succeeded.

In this way, according to the embodiment, as illustrated in FIG. 2B, the number of times of communication required for the first mutual authentication related to the periodic authentication process is three for the periodic authentication commands C4, C5, and C6.

When the authentication on the master processing unit 12 side has been successful, then S12, S13, S14, and S15 are repeated similarly. That is, hereinafter, similarly, the periodic authentication commands C5 are transmitted from the master unit 10 to the slave unit 20 while the master unit 10 newly generates the random number data R4 (i.e. the periodic authentication response demand_master), and the periodic authentication commands C6 are transmitted from the slave unit 20 to the master unit 10 while the slave unit 20 newly generates the random number data R3 (i.e. the periodic authentication response demand_slave). In this way, according to the embodiment, as illustrated in FIG. 2B, the number of times of communication required for the respective second and subsequent mutual authentication related to the periodic authentication process is two for the periodic authentication commands C5 and C6.

Figure 3B:
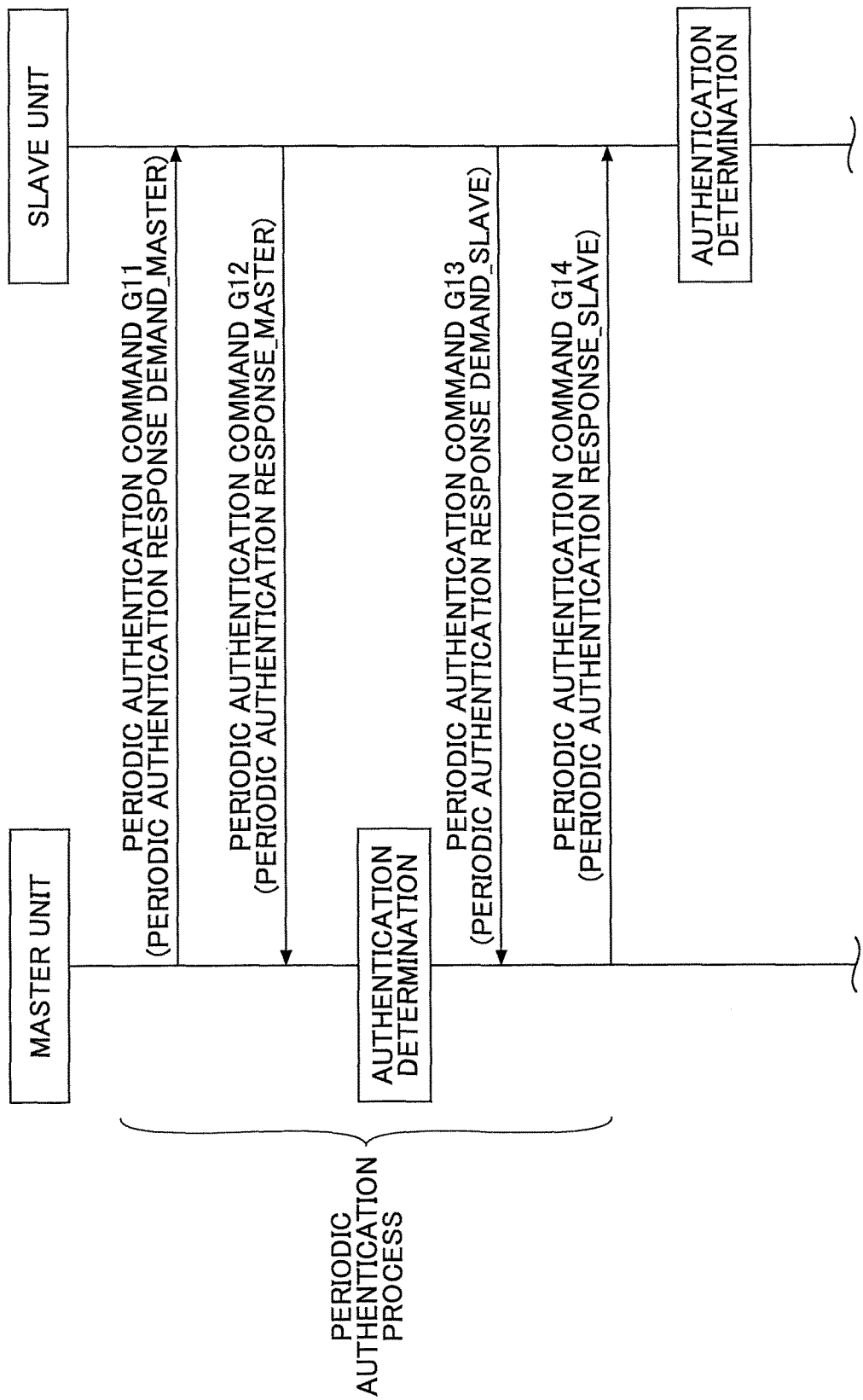
FIG. 3B is a timing chart explaining a periodic authentication process according to a comparative example.

Here, with reference to FIGS. 3A and 3B and in comparison with a mutual authentication process according to a comparative example, the effect of the present embodiment is described.

FIG. 3A is a timing chart explaining an initialization authentication process according to the comparative example, in contrast to FIG. 2A. FIG. 3A is a timing chart explaining a periodic authentication process according to the comparative example, in contrast to FIG. 2B.

According to the initialization authentication process and periodic authentication process by the comparative example, in the case of transmitting the authentication response and the authentication response demand from the master unit 10 to the slave unit 20, a method of transmitting separately the authentication response and the authentication response demand by two commands is used. This is also the case of transmitting the authentication response and the authentication response demand from the slave unit 20 to the master unit 10.

Therefore, in the initialization authentication process and periodic authentication processing according to the comparative example, the required number of times of communication per a single mutual authentication is four, as illustrated in FIGS. 3A and 3B. Specifically, in the initialization authentication process according to the comparative example, the number of times of communication required for the authentication is four by the transmission of start-up authentication commands G1 to G4, as illustrated in FIG. 3A. Similarly, in the periodic authentication process according to the comparative example, the number of times of communication required for one mutual authentication is four by the transmission of periodic authentication commands G11 to G14, as illustrated in FIG. 3B.

In this respect, according to the present embodiment, as described with reference to FIGS. 2A and 2B, the authentication response and the authentication response demand are transmitted by one transmission signal (see the start-up authentication command C3 and the periodic authentication command C5) from the master unit 10 to the slave unit 20, and the authentication response and the authentication response demand are transmitted by one transmission signal (see the start-up authentication command C2 and the periodic authentication command C6) from the slave unit 20 to the master unit 10.

Thus, in the initialization authentication process according to the present embodiment, the number of times of communication required for the mutual authentication, as described above with reference to FIG. 2A, is three, by sending the start-up authentication command C1, C2, and C3, which is reduced as compared with the comparative example. Further, in the first periodic authentication process according to the present embodiment, the number of times of communication required for the mutual authentication is three as described above with reference to FIG. 2B, which is reduced as compared with the comparative example. Further, in the subsequent periodic authentication processes according to the present embodiment, the number of times of communication required for each mutual authentication is two as described above with reference to FIG. 2B, which is reduced as compared with the comparative example.

As a result, according to the embodiment, it is possible to reduce the number of times of communication for the mutual authentication to be performed via the communication line 2 and thus reduce the communication load. If the number of times of communication number for the mutual authentication to be performed via the communication line 2 is reduced, it is possible to correspondingly increase time available for communication for other applications performed via the communication line 2. This enables efficiently increasing an amount of information for applications, other than the mutual authentication, that can be exchanged between the master unit 10 and the slave unit 20. Further, it is possible to shorten the time required for the initialization authentication process at the time of the startup of the vehicle, etc. Thus, for example it becomes possible to accelerate a transition to a state, after the vehicle starts up, in which all communications (all communications including communication other than for mutual authentication purposes) between the master unit 10 and the slave unit 20 can be enabled.

Further, according to the embodiment, since the authentication response demand and authentication response are based on random number data or random data, respectively, it is possible to reduce damage in the event of eavesdropping, as compared with the case where sensitive confidential information, such as fixed password information, is sent to the authenticating side. For example, since the random number data is updated each time (i.e., a one-time password), even if a certain authentication response demand or authentication response is eavesdropped, it is impossible to continue the "spoofing" activity based on the eavesdropped authentication response demand or authentication response.

Figure 4:
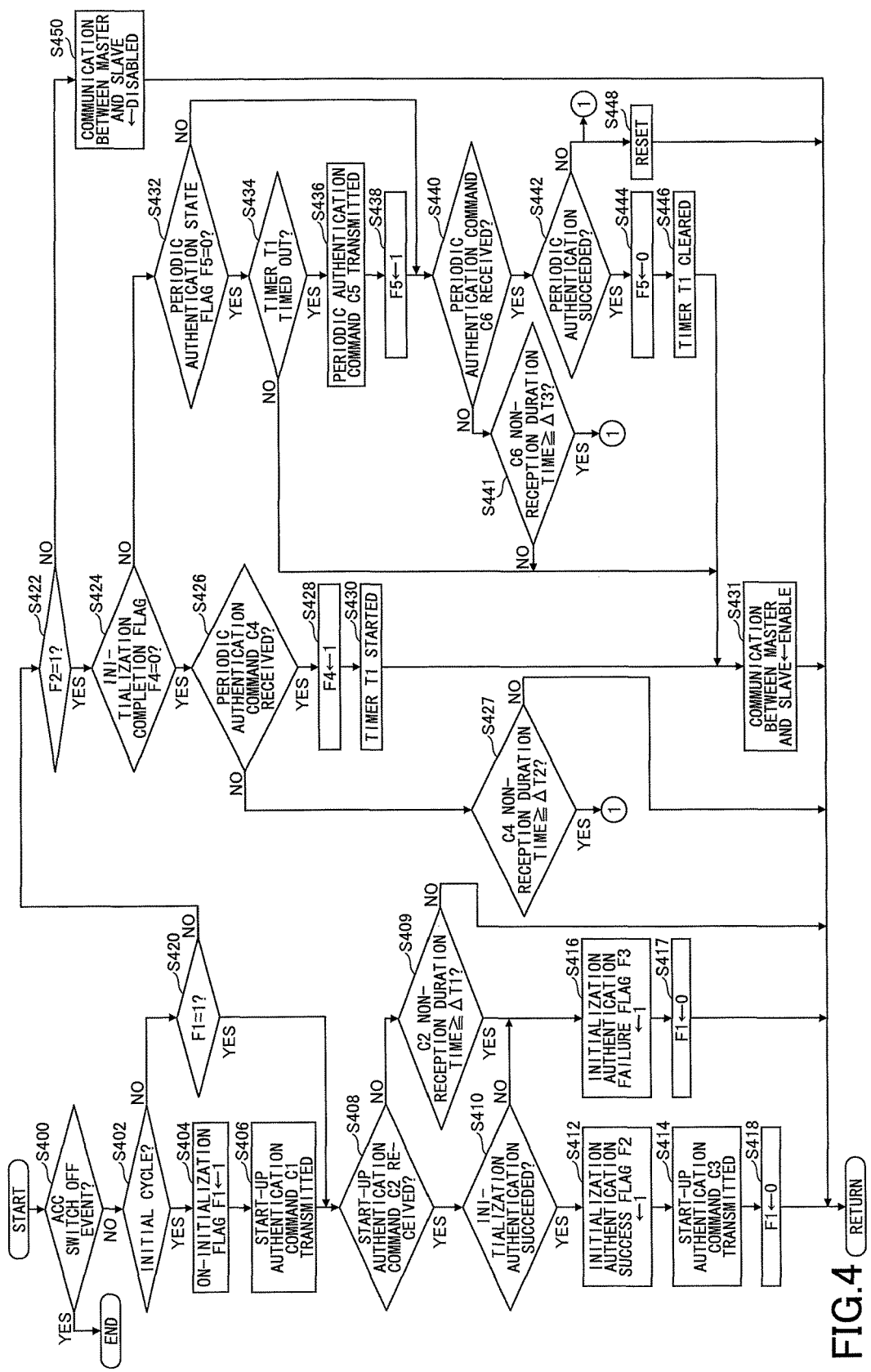
FIG. 4 is a flowchart schematically illustrating an example of a mutual authentication process executed by a master processing unit.

Next, with reference to FIG. 4 and FIG. 5, examples of an operation of the in-vehicle authentication system 1 is described.

FIG. 4 is a schematic flow chart illustrating an example of the mutual authentication process executed by the master processing unit 12 of the master unit 10. The process illustrated in FIG. 4 starts at an ON event of an accessory switch, and is performed at predetermined intervals until the end (i.e., the end of FIG. 4). In the following description, initial values (i.e., values at the ON event of the accessory switch or at the time of resetting) of various flags (an initialization authentication flag F1, etc.) are assumed to be "0". Further, an initial state (i.e., a state at the ON event of the accessory switch or at the time of resetting) related to the communication between the master processing unit 12 and the slave unit 20 is assumed to be ready (enabled) only for the communication for the mutual authentication. Note that the communication for the mutual authentication includes not only the communication related to the authentication commands (the start-up authentication command C1, etc.) but also communication related to a reset demand described later from the slave unit 20 to the master unit 10 (refer to step S514 in FIG. 5).

In step S400, the master processing unit 12 determines whether an OFF event of the accessory switch has occurred. If the determination result is "YES", the process ends, and if the determination result is "NO", the process goes to step S402.

In step S402, the master processing unit 12 determines whether the present processing cycle is any one of the first cycle after a reset event and the first cycle after ON event of the accessory switch. If the determination result is "YES", the process goes to step S404, and if the determination result is "NO" (i.e., if the present processing cycle is the second or subsequent cycle after the reset event or after the ON event of the accessory switch), the process goes to step S420.

In step S404, the master processing unit 12 sets an on-initialization flag F1 to "1". The on-initialization flag F1 being "1" represents a state in which the initialization authentication process is being performed (i.e., during execution of the initialization authentication process).

In step S406, the master processing unit 12 generates the random number data R1, and transmits the start-up authentication command C1 to the slave unit 20 (see S1 in FIG. 2A).

In step S408, the master processing unit 12 determines whether the master unit 10 has received the start-up authentication command C2 associated with the start-up authentication command C1 from the slave unit 20 (see S2 in FIG. 2A). If the determination result is "YES", the process goes to step S410, and if the determination result is "NO", the process goes to step S409.

In step S409, the master processing unit 12 determines whether a non-reception state of the start-up authentication command C2 continues for a predetermined time ΔT1. The predetermined time ΔT1 is adapted such that the predetermined time ΔT1 is longer than time normally required until receiving the start-up authentication command C2 from the transmission of the start-up authentication command C1. If the determination result is "YES", the process goes to step S416, and if the determination result is "NO", the process of the current cycle ends.

In step S410, the master processing unit 12 performs the authentication determination based on the start-up authentication command C2 obtained in step S408 (see S3 in FIG.

2A). If the authentication has been successful, the process goes to step S412, if the authentication has failed, the process goes to step S416.

In step S412, the master processing unit 12 sets an initialization authentication success flag F2 to "1". The initialization authentication success flag F2 being "1" represents a state in which the authentication performed by the master unit 10 as the authenticating side in the initialization authentication process is successful.

In step S414, the master processing unit 12 transmits the start-up authentication command C3 to the slave unit 20 (see S4 in FIG. 2A).

In step S416, the master processing unit 12 sets an initialization authentication failure flag F3 to "1". The initialization authentication failure flag F3 being "1" represents that the authentication performed by the master unit 10 as the authenticating side in the initialization authentication process fails or the non-reception state of the start-up authentication command C2 continues for more than the predetermined time $\Delta T1$.

In step S417, the master processing unit 12 resets the on-initialization flag F1 to "0".

In step S418, the master processing unit 12 resets the on-initialization flag F1 to "0", and ends the process of the current cycle.

In step S420, the master processing unit 12 determines whether the on-initialization flag F1 is "1". If the determination result is "YES", the process goes to step S408, and if the determination result is "NO", the process goes to step S422.

In step S422, the master processing unit 12 determines whether the initialization authentication success flag F2 is "1". If the determination result is "YES", the process goes to step S424, and if the determination result is "NO", the process goes to step S450. Note that, in the case where the process goes to step S450, since the initialization flag F1 is "0" and the initialization authentication success flag F2 is "0", the initialization authentication failure flag F3 is "1".

In step S424, the master processing unit 12 determines whether an initialization completion flag F4 is "0". The initialization completion flag F4 being "0" represents a state in which the initialization is not completed, that is, the master unit 10 has not received the periodic authentication command C4 (see FIG. 2B) from the slave unit 20 after the transmission of the start-up authentication command C3. If the determination result is "YES", the process goes to step S426, and if the determination result is "NO", the process goes to step S432.

In step S426, the master processing unit 12 determines whether the master unit 10 has received the periodic authentication command C4 from the slave unit 20 (see S1 in FIG. 2B). If the determination result is "YES", the process goes to step S428, and if the determination result is "NO", the process goes to step S427.

In step S427, the master processing unit 12 determines whether a non-reception state of the periodic authentication command C4 continues for a predetermined time $\Delta T2$. The predetermined time $\Delta T2$ is adapted such that the predetermined time $\Delta T2$ is longer than time normally required until receiving the periodic authentication command C4 from the transmission of the start-up authentication command C3. If the determination result is "YES", the process goes to step S448, and if the determination result is "NO", the process of the current cycle ends.

In step S428, the master processing unit 12 sets the initialization completion flag F4 to "1". The initialization completion flag F4 being "1" represents that the initialization has been completed (the mutual authentication has been successful in the initializing authentication process).

In step S430, the master processing unit 12 starts a timer T1 that times out for a predetermined time (e.g. 30 seconds), and the process goes to step S431.

In step S431, the master processing unit 12 sets (or maintains) a communication state to a state in which any communication with the slave unit 20 is possible. Therefore, when the periodic authentication command C4 has been received, the communication state transitions from a state in which communication only for the mutual authentication is possible to a state in which any communication (including communication other than for mutual authentication purposes) is possible (i.e., initialization has been completed). Once the initialization has been completed, then the master processing unit 12 can realize the multimedia functions in coordination with the slave processing unit 22.

In step S432, the master processing unit 12 determines whether a periodic authentication state flag F5 is "0". The periodic authentication state flag F5 being "0" represents a transmission waiting state of the periodic authentication command C5. If the determination result is "YES", the process goes to step S434, and if the determination result is "NO", the process goes to step S440.

In step S434, the master processing unit 12 determines whether the timer T1 has timed out. If the determination result is "YES", the process goes to step S436, and if the determination result is "NO", the process goes to step S431.

In step S436, the master processing unit 12 generates the random number data R4, and transmits the periodic authentication command C5 to the slave unit 20 (see S12 in FIG. 2B).

In step S438, the master processing unit 12 sets the periodic authentication state flag F5 to "1" The periodic authentication state flag F5 being "1" represents a transmission completed state of the periodic authentication command C5, which is equal to a reception wait state of the periodic authentication command C6.

In step S440, the master processing unit 12 determines whether the master unit 10 has received the periodic authentication command C6 associated with the periodic authentication command C5 from the slave unit 20 (see S14 in FIG. 2B). If the determination result is "YES", the process goes to step S442, and if the determination result is "NO", the process goes to step S441.

In step S441, the master processing unit 12 determines whether a non-reception state of the periodic authentication command C6 continues for a predetermined time $\Delta T3$. The predetermined time $\Delta T3$ is adapted such that the predetermined time $\Delta T3$ is longer than time normally required until receiving the periodic authentication command C6 from the transmission of the periodic authentication command C5. The predetermined time $\Delta T3$ may be the same as the predetermined time $\Delta T2$. If the determination result is "YES", the process goes to step S448, and if the determination result is "NO", the process goes to step S431.

In step S442, the master processing unit 12 performs the authentication determination based on the periodic authentication command C6 obtained in step S440 (see S15 in FIG. 2B). If the authentication has been successful, the process goes to step S444, if the authentication has failed, the process goes to step S448.

In step S444, the master processing unit 12 sets the periodic authentication state flag F5 to "0". The periodic authentication state flag F5 being "0" represents a transmission waiting state of the periodic authentication command C5 again.

In step S446, the master processing unit 12 clears (starts again) the timer T1, and the process goes to step S431. The timer T1, after having been cleared, times out a predetermined time (e.g. 30 seconds).

In step S448, the master processing unit 12 resets itself, and ends the process of the current cycle. This is because there is a high probability that the slave unit 20 is a "spoofing" part or that there is some abnormality in the slave unit 20. However, because the authentication in the initialization authentication process has succeeded, the processing differs from the case where the authentication in the initialization authentication process has failed (see step S450). This is because the authentication in the initialization authentication process has been successful, and there is a possibility of removing the abnormality in the slave unit 20 by its own reset. If the slave unit 20 is "spoofing", a probability that the authentication fails in the initialization authentication processing after the reset is high, and thus a problem that "spoof" parts can function as a slave unit 20 can be reduced.

In step S450, the master processing unit 12 sets (or maintains) the communication state to a state in which any communication with the slave unit 20 is not possible. That is, the master processing unit 12 rejects any signal from the communication line 2 to disconnect itself from the slave unit 20. In this case, the master processing unit 12, without cooperating with the slave unit 20, operates independently. In this case, the master processing unit 12 can still continue to perform the vehicle setting functions (for example, the setting of the air conditioner 50, etc.) based on the user input via the input device 42. Thus, it becomes possible to assure the vehicle setting functions of relatively high importance even if there is a high probability that the slave unit 20 is a "spoofing" part or that there is some abnormality in the slave unit 20.

FIG. 5 is a schematic flow chart illustrating an example of the mutual authentication process executed by the slave processing unit 22 of the slave unit 20. The process illustrated in FIG. 5 starts at the ON event of the accessory switch, and is performed at predetermined intervals in the ON state of the accessory switch.

In step S500, the slave processing unit 22 determines whether the OFF event of the accessory switch has occurred. If the determination result is "YES", the process ends, and if the determination result is "NO", the process goes to step S502.

In step S502, the slave processing unit 22 determines whether the slave processing unit 22 has received any command for authentication from the master unit 10. If the determination result is "YES", the process goes to step S504, and if the determination result is "NO", the process of the current cycle ends.

In step S504, the slave processing unit 22 determines whether the received command is the start-up authentication command C1. If the determination result is "YES", the process goes to step S506, and if the determination result is "NO", the process goes to step S508.

In step S506, the slave processing unit 22 generates the random number data R2, and transmits the start-up authentication command C2 to the master unit 10 (see S2 in FIG. 2A).

In step S508, the slave processing unit 22 determines whether the received command is the start-up authentication command C3. If the determination result is "YES", the process goes to step S510, and if the determination result is "NO" (i.e., if the received command is the periodic authentication command C5), the process goes to step S516.

In step S510, the slave processing unit 22 performs the authentication determination based on the start-up authentication command C3 obtained in step S502 (see S5 in FIG. 2A). If the authentication has been successful, the process goes to step S512, if the authentication has failed, the process goes to step S514.

In step S512, the slave processing unit 22 generates the random number data R3, and transmits the periodic authentication command C4 to the master unit 10 (see S11 in FIG. 2B).

In step S514, the slave processing unit 22 resets the master unit 10. For example, the slave processing unit 22 sends a reset demand to the master unit 10. This is because there is a high probability that the master unit 10 is a "spoofing" part or that there is some abnormality in the master unit 10. If the master unit 10 is a "spoofing" part, because the determination in step S510 is always "NO", such a problem that a "spoofing" part can operate as the master unit 10 can be reduced. If there is some abnormality in the master unit 10, it may be possible to remove the abnormality by the reset of the master unit 10.

In step S516, the slave processing unit 22 performs the authentication determination based on the periodic authentication command C5 obtained in step S502 (see S13 in FIG. 2B). If the authentication is successful, the process goes to step S518, if the authentication fails, the process goes to step S520.

In step S518, the slave processing unit 22 transmits the periodic authentication command C6 to the master unit 10 (see S14 in FIG. 2B).

In step S520, the slave processing unit 22 resets the master unit 10. This is because there is a high probability that the master unit 10 is a "spoofing" part or that there is some abnormality in the master unit 10. If the master unit 10 is a "spoofing" part, such a problem that a "spoofing" part can operate as the master unit 10 can be reduced because the determination result in step S510 is always "NO". If there is some abnormality in the master unit 10, it may be possible to remove the abnormality by the reset of the master unit 10.

According to the process illustrated in FIGS. 4 and 5, the master processing unit 12, if the authentication on the master unit 10 side in the initialization authentication process has failed, can operate alone until the subsequent OFF event of the accessory switch. Thus, if the authentication on the master processing unit 12 side has failed in the initialization authentication process, the master unit 10 can operate alone such that the master unit 10 is disconnected from the slave unit 20 whose probability of being a "spoofing" part is high. Further, according to the process illustrated in FIG. 4 and FIG. 5, when the authentication on any one of the master unit 10 side and the slave unit 20 side has failed in the periodic authentication process, the master unit 10 can reset. Thus, if the mutual authentication is successful in the initialization authentication process after the reset, it is possible to restore the operation in coordination between the master unit 10 and the slave unit 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Further, all or part of the components of the embodiments described above can be combined.

For example, in the embodiment described above, two authentication target apparatuses that exchange information via the communication line 2 are the master unit 10 and the slave unit 20, and there is a master-slave relationship; however, this is not indispensable. Two authentication object apparatuses that exchange information via the communication line 2 may be of an equal relationship. In this case, the slave unit 20 may be directly coupled to the vehicle network 90. Further, in this case, the master unit 10 may reset the slave unit 20 when the authentication in the initializing authentication process as an authenticating side has failed.

Further, in the embodiment described above, the master unit 10 and the slave unit 20 exchange information via a wired communication path (i.e., the communication line 2); however, this is not indispensable. The communication path for exchanging information between the master unit 10 and the slave unit 20 may be a wireless communication path (transmission path). Further, the communication path for exchanging information between the master unit 10 and the slave unit 20 may be a combination of a wireless communication path and a wired communication path.

Further, in the embodiment described above, the master unit 10 is coupled to a single slave unit 20; however, this is not indispensable. The master unit 10 may be coupled to a second slave unit similar to the slave unit 20 in a similar manner as the slave unit 20. Again, in this case, mutual authentication between the master unit 10 and the second slave unit can be implemented in a similar manner as the mutual authentication between the master unit 10 and the slave unit 20.

Further, in the embodiment described above, the mutual authentication in a one-to-one form between the master unit 10 and the slave unit 20 is implemented; however, this is not indispensable. The present invention is also applicable to one-to-many mutual authentication. For example, the master unit 10 may be coupled to more than two in-vehicle apparatuses, which are subject to the mutual authentication, via the vehicle network 90. In this case, exchanges of authentication information between the master unit 10 and two or more of the in-vehicle apparatuses can be realized via the vehicle network 90. For example, when the vehicle network 90 is a CAN, the authentication command from the master unit 10 to each of two or more of the in-vehicle apparatuses can be transmitted using a common message. That is, by using the message with a CAN_ID which two or more of the in-vehicle apparatuses can receive, the number of messages to be transmitted from the master unit 10 per mutual authentication can be reduced.

Further, in the above embodiment, the master unit 10 and the slave unit 20 are installed in the vehicle; however, this is not indispensable. For example, the slave unit 20 may be a mobile terminal carried by a user in the vehicle. In this case, authentication application for performing processing as described above is downloaded to the mobile terminal from a server (not illustrated), for example. In this case, the server may manage hash functions associated with user information, transmit the authentication application and the hash function to the mobile terminal, and transmit the hash function for the mobile terminal to the master unit 10 of the vehicle of the user.

Further, in the embodiments described above, a coding pattern of N (N≥2) may be utilized, in addition to the random number data, for the mutual authentication between the master unit 10 and the slave unit 20. In this case, the authentication response demand_master to be included in the start-up authentication command C1 includes, in addition to the random number data R1, the selected coding pattern Ki of the N coding patterns. The slave processing unit 22, if having received the start-up authentication command C1, encodes the random number data R1 with the coding pattern Ki related to the authentication response demand_master, and calculates the hash value of the encoded data to generate the authentication response_master to be included in the authentication command C2. In this case, the master processing unit 12 can compare the hash value of the authentication response_master from the slave unit 20 with the hash value of data, which can be obtained by coding the random number data R1 using the coding pattern Ki, to obtain the authentication determination. This also applies to other authentication determination (including the authentication determination on the slave processing unit 22 side).

Further, in the above embodiment, the master processing unit 12 calculates the hash value of the random number data R1 based on the hash function in the storage unit 14 at the time of the authentication determination triggered by the reception of the start-up authentication command C2. That is, the master processing unit 12 may calculate, prior to receiving the start-up authentication command C2, the hash value of the random number data R1 based on the hash function in the storage unit 14. For example, the master processing unit 12 may calculate the hash value of the random number data R1 when the master processing unit 12 generates the random number data R1. This also applies to other authentication determination (including the authentication determination on the slave processing unit 22 side).

Further, in the above embodiment, the periodic authentication command C4 also has the above-described notification function; however, this is not indispensable. For example, in one variant, the notification function described above is realized by another command. That is, in a variant, another notification command for notifying the master processing unit 12 that the authentication on the slave unit 20 side in the initial authentication process is successful is transmitted from the slave unit 20 to the master unit 10, prior to the periodic authentication command C4. Again, still compared with the comparative example (see FIG. 3A), it becomes possible to reduce the number of times of communication between the master unit 10 and the slave unit 20 to be performed for the initialization authentication process. This is because, also in the case of the comparative example (see FIG. 3A), a similar notification command is necessary. Further, in such a variant, the periodic authentication process is not required to be triggered by the transmission of the periodic authentication command C4 from the slave unit 20 to the master unit 10. For example, the periodic authentication process may be initiated by the master unit 10 sending a periodic authentication command Z1 which is the same as the start-up authentication command C1. In this case, the slave unit 20 transmits, in response to the periodic authentication command Z1, a periodic authentication command Z2, which corresponds to the periodic authentication command C6, to the master unit 10. Then, the master unit 10 transmits, in response to the periodic authentication command Z2, a periodic authentication command Z3 corresponding to the periodic authentication command C5 to the slave unit 20, and, thereafter, the transmission of the periodic authentication command Z2 by the slave unit 20 in response to the periodic authentication command Z3 and the transmission of the periodic authentication command Z3 by the master unit 10 in response to the periodic authentication command Z2 are repeated, respectively.

Further, in the embodiment described above, in the example illustrated in FIG. 4, if the determination result in the step S409 is "YES", the process goes to step S416; however, this is not indispensable. For example, if the determination result in the step S409 is "YES", the process may go to step S448 such that a retry by the reset is performed. As a result of the retry, if the determination result in step S409 is still "YES", the process may go to step S416.

Further, in the above embodiment, the initialization authentication process and the periodic authentication process are executed; however, this is not indispensable. For example, only the initialization authentication process may be performed.

What is claimed is:

1. An in-vehicle authentication system, comprising:
a first authentication object apparatus; and
a second authentication object apparatus configured to perform communication with the first authentication object apparatus, wherein
the first authentication object apparatus and the second authentication object apparatus are configured to perform mutual authentication via the communication such that a relationship between an authenticating side and an authenticated side is exchanged, and
at least one of the first authentication object apparatus and the second authentication object apparatus transmits, to a counterpart, an authentication response in response to an authentication response demand from the counterpart and an authentication response demand from itself to the counterpart by a single transmission signal.

2. The in-vehicle authentication system of claim 1, wherein the first authentication object apparatus and the second authentication object apparatus perform the mutual authentication as initial mutual authentication,
in the initial mutual authentication,
the first authentication object apparatus transmits a first authentication response demand by a first signal,
the second authentication object apparatus transmits an authentication response in response to the first authentication response demand and a second authentication response demand by a second signal, the second signal being the single transmission signal, and
the first authentication object apparatus transmits an authentication response in response to the second authentication response demand by a third signal.

3. The in-vehicle authentication system of claim 2, wherein the first authentication object apparatus and the second authentication object apparatus, after the initial mutual authentication has been successful, perform the mutual authentication as periodical mutual authentication,
in the periodical mutual authentication,
first, one of the first authentication object apparatus and the second authentication object apparatus transmits a third authentication response demand by a fourth signal,
the other of the first authentication object apparatus and the second authentication object apparatus transmits an authentication response in response to the third authentication response demand and a fourth authentication response demand by a fifth signal, the fifth signal being the single transmission signal,
the one transmits an authentication response in response to the fourth authentication response demand and a fifth authentication response demand by a sixth signal, the sixth signal being the single transmission signal, and
then, the other and the one transmit the fifth signal newly generated and the sixth signal newly generated, alternately and respectively, the authentication response related to the fifth signal newly generated being in response to the fifth authentication response demand instead of the third authentication response demand.

4. The in-vehicle authentication system of claim 3, wherein the one is the second authentication object apparatus,
the second authentication object apparatus, after authentication performed as an authenticating side in the initial mutual authentication has been successful, transmits the fourth signal, and
the first authentication object apparatus, after having received the fourth signal, causes a transition to a state in which the communication is fully enabled.

5. The in-vehicle authentication system of claim 4, wherein, in the periodical mutual authentication, the first authentication object apparatus, if authentication performed as an authenticating side has been successful, maintains the state in which the communication is fully enabled, and, if the authentication performed as an authenticating side has not been successful, performs a self-initialization.

6. The in-vehicle authentication system of claim 3, wherein, in the initial or periodical mutual authentication, the second authentication object apparatus, if authentication performed as an authenticating side has not been successful, generates a reset signal to cause the first authentication object apparatus to be initialized.

7. The in-vehicle authentication system of claim 2, wherein only the first authentication object apparatus, of the first authentication object apparatus and the second authentication object apparatus, is directly coupled to a vehicle network, and
in the initial mutual authentication, the first authentication object apparatus, if authentication performed as an authenticating side has not been successful, implements a predetermined function via the vehicle network independently from the second authentication object apparatus.

* * * * *